Feb. 18, 1941. W. H. GILLE 2,232,601
HYDRAULIC BRAKE FAILURE PREVENTER
Filed Oct. 25, 1939 3 Sheets-Sheet 1

Inventor
Willis H. Gille
By Williamson & Williamson
Attorneys

Feb. 18, 1941.  W. H. GILLE  2,232,601
HYDRAULIC BRAKE FAILURE PREVENTER
Filed Oct. 25, 1939  3 Sheets-Sheet 2

Inventor
Willis H. Gille
By Williamson & Williamson
Attorneys

Feb. 18, 1941.   W. H. GILLE   2,232,601
HYDRAULIC BRAKE FAILURE PREVENTER
Filed Oct. 25, 1939   3 Sheets-Sheet 3

Inventor
Willis H. Gille
By Williamson & Williamson
Attorneys

Patented Feb. 18, 1941

2,232,601

UNITED STATES PATENT OFFICE 2,232,601

HYDRAULIC BRAKE FAILURE PREVENTER

Willis H. Gille, St. Paul, Minn.

Application October 25, 1939, Serial No. 301,226

17 Claims. (Cl. 303—84)

My invention relates to hydraulic brake operating systems such as are used in automotive vehicles and particularly to apparatus for preventing failure of such systems due to fluid leaks therein.

The usual hydraulic brake system includes a pedal operated master unit for production of fluid pressure in communication with a conduit having branch conduits leading to respective individual fluid pressure actuated brake shoe operating units. In such a system a fluid leak in any one of the brake shoe operating units or branch conduits will not only result in loss of a quantity of fluid but will prevent production of pressure in the system and thus render the entire system inoperative for braking purposes. The possibility of a brake system failure of this kind obviously creates a serious hazard in the operation of a vehicle equipped with a hydraulic brake system.

Various devices have been designed for preventing complete failure of a hydraulic brake system in the event that a fluid leak occurs in any branch conduit or individual brake operating unit. One such device is shown in Fig. 7 of Patent No. 1,967,383, issued to Turgot on July 24, 1934. This device includes in a chamber a normally centered member 5 serving as a pair of pistons which will shift toward one of the other of ports at the respective ends of the chamber when there is an unbalance in fluid flow through the respective parts and will function as a valve to close the one of said ports through which the greater amount of fluid is flowing. Such a device, which may and will hereinafter be referred to as a balanced valve device, will function to block flow of fluid to a leaky part of a hydraulic brake system but may also, at times, due to being jarred, to momentary disturbances in the system or to other causes, operate to block flow of fluid to part of the system when there is no leak in the system and such unnecessary operation hence constitutes a disadvantage rather than an advantage.

A general object of my invention is to provide a balanced valve safety device constructed to obviate the possibility of unnecessary operations thereof.

A more specific object is to provide such a device including means which normally restrains the device from operating and which will release the device for operation only responsive to lack of normal braking pressure in the system when the piston of the master unit has been moved to a position whereat normal pressure is ordinarily attained.

Another object is to provide such a device which is automatically self adjusting to compensate for the usual gradual change in the position of the piston of the master unit whereat normal braking pressure is attained.

A further object is to provide such a device of simple, compact, light, rugged and inexpensive construction.

These and other objects and advantages of the invention will more fully appear from the following description made in connection with the accompanying drawings, wherein like reference characters refer to the same parts throughout the views, and, in which:

Figure 6:
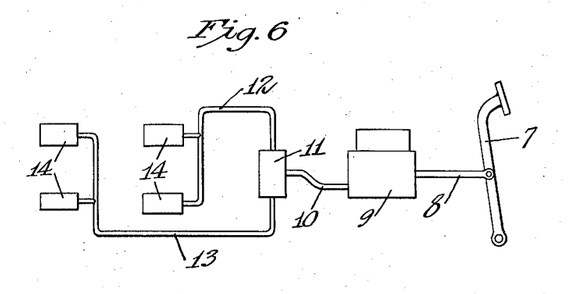
Fig. 6 is a diagrammatic representation of a system of the type wherein my device would be incorporated.

Referring to the drawings Fig. 6 illustrates diagrammatically a hydraulic brake system for automotive vehicles including a brake pedal 7 connected through a rod 8 to the piston of a master cylinder unit 9. The outlet of the master cylinder 9 is connected through a conduit 10 to a safety device 11 of the balanced valve type. The outlet ports of the safety device 11 are connected through conduits 12 and 13 to respective independent pairs of individual brake shoe operating cylinder units 14. My device is designed for use in connection with the brake pedal master cylinder unit and safety device of such a system.

Figure 1:
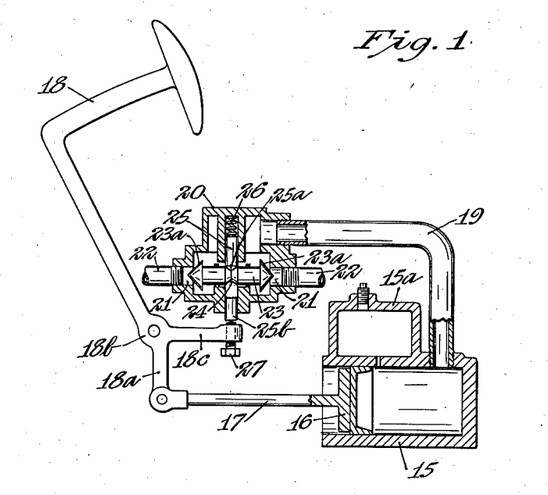
Fig. 1 is a more or less diagrammatic view of a portion of a hydraulic brake system wherein a simplified embodiment of my invention is incorporated.

Fig. 1 illustrates a very simple form of my device not including the refinements and self-adjusting features provided in the devices of Figs. 2 to 5 inclusive. Fig. 1 includes a master cylinder 15 having therewithin a piston 16 connected through a rod 17 to an arm 18a carried by a brake pedal 18. The master cylinder 15 may be equipped with the usual fluid reservoir 15a associated therewith in a conventional manner. The pressure chamber of the master cylinder 15 is connected through a conduit 19 to the interior of a balanced valve safety device 20. The safety device 20 has fluid outlet ports 21 in respective ends thereof adapted to be connected as through the conduits 22 to respective groups of brake shoe operating cylinder units. Between the outlets 21 is a normally centered longitudinally movable member 23 having at its respective ends enlarge portions 23a adapted for closing the outlet ports 21. The member 23 through its enlarged end portions 23a constitutes twin pistons which when an excessive flow of fluid through one of the outlets 21 occurs will draw the member 23 longitudinally toward the outlet 21 to close the same and thus block flow of fluid to a conduit 22 which is leaking or an individual brake shoe operating unit which is leaking. At its center the member 23 is provided with an annular V-shaped groove 24. A plunger 25 is mounted in the safety device 20 for movement in a direction normal to the axis of the member 23. The medial portion of the plunger 25 is apertured to accommodate extension of the member 23 therethrough. A portion 25a of the plunger 25 defining the central aperture thereof and situated above the member 23, as viewed in Fig. 1, is V-shaped for engagement in the groove 24. A spring 26 is provided for pressing the V-shaped part of the plunger 25 into engagement with the groove 24. The lower end 25b of the plunger 25 extends to a point outside of the limits of the safety device 20. The plunger 25a constitutes means for normally retaining the member 23 in centered position, and may be shifted upwardly to release the member 23 for longitudinal movement.

Means is provided for shifting the plunger 25 out of retaining position responsive to movement of the brake pedal 18 beyond the position thereof whereat full braking pressure is normally obtained. For this purpose the hub portion 18b is provided with an arm 18c which extends to a point beneath the lower end 25b of the plunger 25 and moves toward the plunger 25 responsive to brake applying movement of the pedal 18. For purposes of adjustment the free end of the arm 18c may be provided with a screw 27 as shown, the upper end of which is aligned with the lower end 25b of the plunger 25. The screw 27 should be so adjusted as to just make contact with the lower end 25b of the plunger 25 as the brake pedal 18 reaches the position thereof whereat full braking pressure is ordinarily produced.

Should a leak develop in one of the conduits 22 or a brake shoe operating unit served thereby pressure on the pedal 18 will result in a certain amount of fluid escaping through the leak. The pedal 18 will, therefore, move through a greater distance than normal with the result that the screw 27 will raise the plunger 25 to release the member 23 for longitudinal movement. The usual operation of the member 23 will then occur as in any balanced valve safety device of this type and the outlet port 21 in communication with the leaky portion of the system will be closed. Continued brake applying movement of the pedal 18 will then operate to build up braking pressure which will be communicated to the brake shoe operating units served by the remaining one of the outlet ports 21. Thus failure of the entire brake system will not occur responsive to a leak in one part of the system. In balanced valve safety devices wherein no means is provided for normally retaining the movable member in centered position unnecessary operations of the movable member may take place as a result of momentary disturbance in the braking system, jarring or other conditions occuring during a braking operation. It should be apparent that my retaining means prevents such unnecessary and undesirable operations of the safety device and yet permits normal operation of the safety device whenever a leak does occur in the system.

Figure 2:
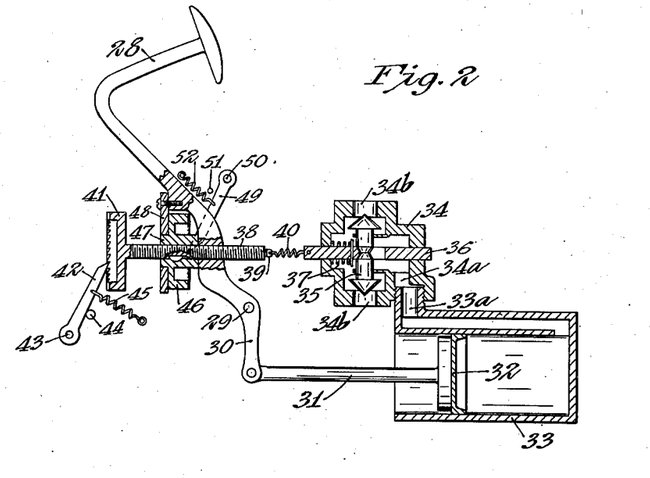
Figs. 2 and 3 are more or less diagrammatic views of portions of respective hydraulic brake systems wherein respective variations of an entirely mechanical form of my device are incorporated.
Figure 3:
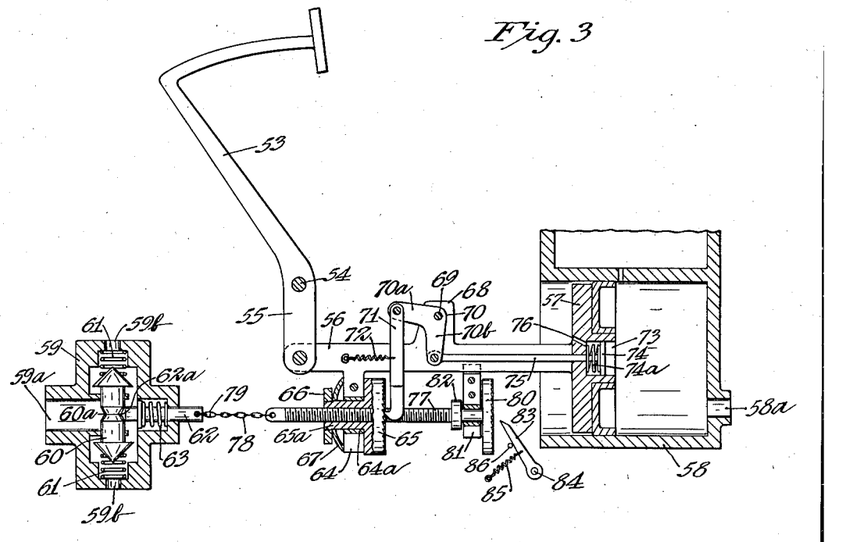

Figs. 2 and 3 illustrate a form of the above described device including a mechanical means for adjusting the device to compensate for the gradual change in the position of the brake pedal whereat full braking pressure will be obtained, this gradual change being the result of wear in mechanical portions of the system particularly wear of the friction surfaces of the brake shoes.

In Fig. 2 a brake pedal 28 is pivotally mounted at 29 and has a lower arm 30 connected through a rod 31 attached to a master piston 32 working in a master cylinder 33. The outlet 33a of the master cylinder 32 is connected to the inlet 34a of a balanced valve safety device 34. The safety device 34 has respective outlets 34b between which a longitudinally movable normally centered piston and valve member 35 is situated. The member 35 is similar to the member 23 of Fig. 1 and is provided with retaining means in the form of a plunger 36 which is generally similar to the plunger 23 of Fig. 1. The plunger 36 is movable to the left out of retaining position and is urged to the right by suitable means such as a spring 37. The left-hand end of the plunger 36 extends to a point outside of the limits of the safety device 34 to be accessible for outward pulling thereof to shift the plunger 36 out of retaining position.

At a point a moderate distance above the point 29 at which the brake pedal 28 is pivoted the brake pedal is apertured and internally screw threaded and carries in screw threaded engagement therein a screw 38. The rear end of the screw 38 is connected through a swivel connection element 39 and a helical tension spring 40 to the forward end of the plunger 36. The forward end of the screw 38 is provided with a crown ratchet 41. Forward of the ratchet 41 is a pawl 42 pivotally mounted on a fixed pivot 43. The working end of the pawl 42 is situated for engagement with the teeth of the ratchet 41 at the side thereof farthest from a viewer of Fig. 2. Rearward movement of the pawl 42 is limited by means of a fixed stop element 44 and a helical tension spring 43 is provided for maintaining rearward pressure on the pawl 42.

Immediately forward of the brake pedal arm 28 is a rearwardly facing crown ratchet 46 mounted on the screw 38 for longitudinal movement of the screw therethrough. A key 47 and suitable key-ways in the screw 38 and ratchet 46 is provided to prevent rotation of the ratchet 46 relative to the screw 38. Forwardly of the ratchet 46 is a centrally apertured member 48 mounted on the brake pedal arm 28 and frictionally engaging the forward side of the ratchet 46. Immediately rearwardly of the ratchet 46 is a pawl 49 swingably mounted on a fixed pivot 50 and situated for engagement of its working end with the teeth of the ratchet 46 on the side thereof farthest from a viewer of Fig. 2. A fixed stop element 51 is provided to limit forward movement of the pawl 49 and a helical tension spring 52 is provided to maintain upwardly directed pressure on the pawl 49.

When the brake pedal 28 is pressed forwardly in a brake applying operating the pawl 42 moves on the ratchet 41 to screw the screw 38 toward the plunger 36, and when the brake pedal is released and moves toward its normal non-braking position the pawl 49 moves on the ratchet 46 to screw the screw 38 away from the plunger 36. The proportions of the ratchets 41 and 46 and the pawls 42 and 49 and the positions of the pivots 43 and 50 and stops 44 and 51 are so selected that the screw 38 will be screwed through approximately the same distances in opposite directions during each complete cycle of brake applying and brake releasing movement of the pedal 28. However, if wear takes place in the brake shoes, the pedal will be depressed through gradually increasing distances and hence the pawl 42 and ratchet 41 will tend to screw the screw 38 to the right relative to the brake pedal arm 30 to a very slight greater degree than the pawl 49 and ratchet 46 screws the screw 38 to the left. In this manner the device is constantly re-adjusted to compensate for normal wear in the braking system and is capable of releasing the safety device for operation thereof whenever during a given braking operation the pedal 28 is depressed to an appreciable greater distance to obtain full braking pressure than was the case in the preceding braking operation.

Fig. 3 illustrates a slightly different arrangement of parts similar to those constituting the device of Fig. 2. The structure of Fig. 3 includes a brake pedal 53 mounted on a pivot 54 and having a lower arm 55 connected through a bar 56 to a master piston 57 working in a master cylinder 58. A balanced valve safety device 59 is provided having a fluid inlet 59a adapted for connection to a fluid outlet 58a provided in the master cylinder 58. The safety device 59 includes fluid outlets 59b in respective ends thereof between which is situated a piston and valve member 60 similar to the member 23 of Fig. 1. At the ends of the member 60 are provided helical compression springs 61 proportioned for exerting only very slight pressures for the purpose of returning the member 60 to a centered position thereof following an operation of the member 60 caused by leakage in a portion of the system with which the safety device 59 is used. The member 60 is provided in its central portion with a V-shaped groove 60a similar to the groove 24 of the member 23 in Fig. 1. A plunger 62 is provided having a V-shaped inner end 62a adapted for engagement in the groove 60a. A helical compression spring 63 is arranged for normally holding the V-shaped end 62a of the plunger 62 in engagement in the groove 60a. The outer or right-hand end of the member 62 projects outwardly of the safety device 59 and may be pulled outwardly to shift the plunger 62 out of its retaining position. The bar 56 is provided with a downwardly projecting apertured bracket 64 wherein a bearing bushing 64a is provided. A rearwardly facing crown ratchet 65 is disposed to the right of the bracket 64 and has a forwardly extending journal element 65a journalled in the bushing 64a. The forward end of the journal element 65a is externally screw threaded and provided with a nut 66. A dished centrally apertured resilient friction element 67 is interposed between the nut 66 and the bracket 64 under pressure. An upstanding lug 68 is formed on the upper side of the bar 56 at a point somewhat rearwardly of the ratchet 65. The lug 68 carries a pivot 69 on which is mounted a bell crank 70 having a forwardly projecting arm 70a and a downwardly projecting arm 70b. A pawl 71 is pivotally mounted on the free end of the forwardly projecting arm 70a in depending relation therewith. The free end of the pawl 71 projects upwardly and forwardly and is positioned for engagement with the teeth of the ratchet 65 at the side thereof nearest a viewer of Fig. 3. A helical tension spring 72 is provided for maintaining forwardly directed pressure on the pawl 71. The inner side of the master piston 57 is recessed to form an auxiliary cylinder 73 having an axis parallel to the bar 56. An auxiliary piston 74 is disposed in the recess 73 and is connected by means of a rod 75 to the free end of the lower arm 70b of the bell crank 70. A helical compression spring 74a is interposed between the piston 74 and the crossed end of the recess 73. A small vent passage 76 is formed in the master piston 57 leading from the inner end of the recess 73 to the atmosphere. The piston 74 will be shifted forwardly responsive to pressure within the master cylinder 58 and will function to operate the pawl 71 for clockwise rotation of the ratchet 65 as viewed from the right of Fig. 3. The distance to which the piston 74 will be moved and consequently the extent to which the ratchet 65 will be rotated will be in proportion to the pressure developed within the master cylinder 58. The ratchet 65 and the journal element 65a thereof are axially apertured and internally screw threaded. A screw 77 is screw threadedly carried in the aperture of the ratchet 65 and journal element 65a. The forward end of the screw 77 is connected to the rear end of the plunger 62 of the safety device 69 by suitable means such as a chain 78 and a swivel element 79. The rear end of the screw 77 is provided with a rearwardly facing crown ratchet 80 immediately forwardly of which the material forming the screw 77 is not provided with screw threads. Associated with the unthreaded portion of the screw member 77 is a member 81 encircling the same in frictional engagement therewith. The upper end of the member 81 is bifurcated and straddles the lower portion of the bar 56 so as to be slidable therealong but retained thereby against rotation about the axis of the screw 77. A collar 82 is provided on the screw 77 immediately forwardly of the frictional member 81. Rearwardly of the ratchet 80 a pawl 83 is provided mounted on a fixed pivot 84 and forwardly pressed by means of a helical tension spring 85. A fixed stop element 86 is provided to limit forward swinging movement of the pawl 83. The pawl 83 is situated for engagement with the teeth of the ratchet 80 at the side thereof nearest a viewer of Fig. 3 responsive to a brake applying movement of the bar 56.

As the pedal 53 is moved forwardly in brake applying operation the piston 74 will be actuated by pressure within the master cylinder 58 to rotate the ratchet 65 in such direction as to move the screw 77 linearly rearwardly relative to the bar 56. During the above mentioned brake applying movement the ratchet 80 will come into engagement with the pawl 83 and will thereby be operated to screw the screw 77 forwardly relative to the bar 56. The various parts of the device are so proportioned that the forward and rearward movements of the screw 77 produced through the action of the pawls 71 and 83 on the ratchets 65 and 80 will ordinarily be equal and hence cancel each other. However, as wear in the system, such as wear of the brake shoes, takes place the pedal 53 will be pressed forward to gradually increasing distances in order to reach positions wherein full braking pressure will be produced. These increasing distances will cause the pawl 83 to rotate the ratchet 80 through a very slight greater angle than the ratchet 65 is rotated during a cycle of brake operation and hence the screw 77 will be very gradually shifted forwardly in accordance with wear in the system. The plunger 63 will thus not be retracted from retaining position by normal braking operations even after considerable wear has taken place in the system, but will be operated to release the member 60 in response to any movement of the brake pedal 53 through a substantially greater distance in one brake operating cycle than in the preceding brake operating cycle in producing full braking pressure.

It is to be noted that in each of the above described embodiments of my invention lost motion means is provided between the brake pedal and the shiftable retaining means of the balanced valve safety device. In the form of Fig. 1 the grip between the screw 27 and the plunger 25b provides lost motion effect. In Fig. 2 the tension spring 40 provides lost motion effect. In Fig. 3 the chain 78 provides lost motion effect.

Figure 4:
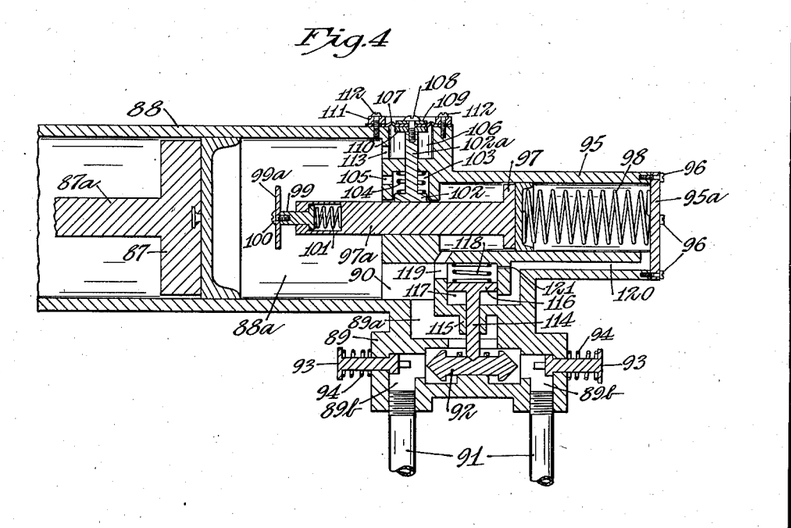
Figs. 4 and 5 are more or less diagrammatic views of portions of respective hydraulic brake systems wherein respective variations of a partially hydraulic form of my device are incorporated.
Figure 5:
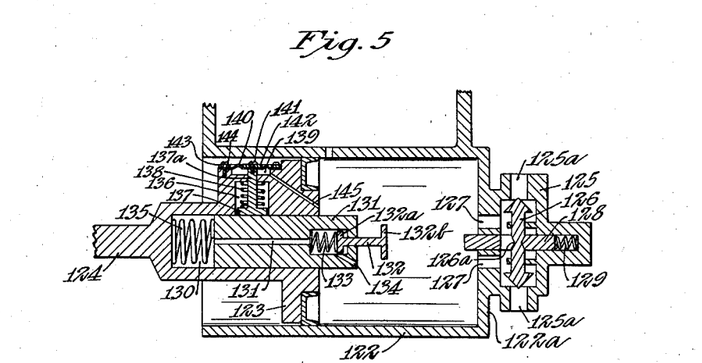

Figs. 4 and 5 illustrate a type of my device wherein hydraulic means is interposed between the brake pedal and the shiftable retaining means of the safety device.

Fig. 4 shows a structure including a master piston 87 operating in a master cylinder 88 and provided with a shank 87a which may be connected to a brake pedal in a manner similar to that illustrated in any of Figs. 1 to 3 inclusive. A balanced valve safety device 89 is provided and the exterior portion thereof may be formed integrally with the head portion of the master cylinder 88 as shown. The fluid inlet 89a of the safety device 89 communicates with the pressure chamber 88a of the master cylinder 88 through a passage 90. The safety device 89 is provided with respective outlet ports 89b adapted for connection by means of conduits such as the conduits 91 to independent groups of brake shoe operating units. The normally centered longitudinally shiftable piston and valve member 92 of the safety device 89 is generally similar to the member 23 of Fig. 1, but preferably is of square cross section and provided with a recess in the upper side thereof for receiving a suitable retaining means. Each end of the safety device 89 is provided with a plunger 93 for the purpose of inserting the member 92 in its centered normal position following an operation of the member 92. Helical compression springs 94 are provided for maintaining the plungers 93 in retracted position.

An auxiliary cylinder 95 is provided on the outside of the head of the master cylinder 88a and may be formed integrally therewith preferably in co-axial relation therewith. The auxiliary cylinder 95 is provided with a detachable head 95a secured to the remainder of the auxiliary cylinder 95 by suitable means such as the screws 96. Working within the auxiliary cylinder 95 is an auxiliary piston 97 having an operating shank 97a projecting through a suitable aperture in the head of the master cylinder 88 into the pressure chamber 88a of the master cylinder 88. A helical compression spring 98 is placed between the piston 97 and the head 95a of the auxiliary cylinder 95. The left-hand or free end of the shank 97a is provided with an axially movable plunger 99 having a centrally apertured contact plate 99a secured to the outer end thereof by suitable ends such as the screw 100. A helical compression spring 101 is provided for yieldingly maintaining the plunger 99 in outwardly projected position. A brake element 102 working on the shank 97a is contained in a suitable recess 103 formed in the head of the master cylinder 88. The brake element 102 has a push rod 102a extending outwardly thereof radially with respect to the shank 97a whereby the brake element 102 may be guided in movement thereof radially with respect to the shank 97a. A helical compression spring 104 is provided in the recess 103 for yieldingly holding the brake element 102 in braking relation with the shank 97a. A vent duct 105 is provided communicating between the recess 103 and the pressure chamber 88a of the master cylinder 88. The push rod 102a is slidably extended through a suitable aperture formed in a portion of the head of the master cylinder 88 lying radially outwardly of the recess 103. A radially outwardly opening recess 106 containing the free end of the push rod 102a is formed in the head of the master cylinder 88. The outer end of the recess 106 is closed by a deflectable diaphragm 107, the central portion of which is secured to the free end of the push rod 102a by means of a screw 108 and washers 109 and 110, the marginal portion of which is secured and sealed to the head of the master cylinder 88 by means of a ring 111 which is anchored to the head of a master cylinder 88 by suitable means such as the screws 112. A passage 113 is provided communicating between the recess 106 and the pressure chamber 88a of the master cylinder 88 so that the diaphragm 107 will be subjected at its inner side to the pressure developed in the pressure chamber 88a whereby such pressure will deflect the diaphragm 107 outwardly to shift the brake element 102 out of braking relation with the shank 97a.

For engagement in the recessed portion of the upper side of the safety device member 92 a plunger 104 is provided. The plunger 114 extends radially relative to the member 92 and is movable radially thereof. The medial portion of the retaining element 114 is longitudinally slidably carried in a guide 115 therefor formed in the structure lying between the safety device 89 and the head of the master cylinder 88. The upper end of the retaining element 114 carries a piston 116 working in a cylindrical chamber 117 provided therefor. A helical spring 118 is provided in the upper portion of the chamber 117 to yieldably retain the piston 116 and retaining element 114 in a downwardly pressed position. The upper portion of the chamber 117 communicates with the pressure chamber 88a of the master cylinder 88 through a passage 119 opening into the previously described passage 90. The lower portion of the chamber 117 is in communication with the pressure chamber of the auxiliary cylinder 97 through a passage 120. A restricted bleed passage 121 is provided communicating between the passage 120 and the upper portion of the chamber 117. Accordingly this bleed passage 121 is in communication with the pressure chamber 88a of the master cylinder 88. Obviously hydraulic pressure developed within the auxiliary cylinder 95 will work on the retaining means piston 116 to retract the retaining means out of retaining relation with the balanced valve member 92 of the safety device 89.

Such pressure will be developed within the auxiliary cylinder 95 when brake applying movement of the master piston 87 is communicated to the shank 97a. The shank 97a will normally be held by the brake 102 in such position that the plate 99a will be contacted by the master piston 87 which is before the piston 87 has moved far enough to produce full braking pressure. The last portion of braking movement of the piston 87 will be accompanied by movement of the plunger 99 relative to the shank 97a against the pressure of the spring 101. Just before the spring 101 has been sufficiently compressed to overcome the pressure of the spring 98 of the auxiliary piston 97 and the pressure of the spring 118 hydraulically communicated to the piston 97 full braking pressure will have been obtained within the pressure chamber 88a of the master cylinder 88, the brake 102 will have been released due to development of pressure in the pressure chamber 88a approximately at the time when the piston 87 engages the plate 99a. During each braking operation the piston 97 and shank 97a will be disposed between the springs 98 and 101 with the spring 101 backed by the master piston 97. Since the brake 102 will at such time be in released position the auxiliary piston 97 and shank 97a will take a position corresponding to the position of the master piston 87 at which full braking pressure is obtained. When the brake pedal starts on its brake releasing movement the piston 87 will start moving to the left and a sudden drop in pressure in the pressure chamber 88a will result, with the secondary result that the brake 102 will be applied to the shank 97a to retain the auxiliary piston 97 and shank 97a in the positions which they have assumed during the braking operation. Thus the shank 97a will not follow the master piston 87 in a brake releasing movement thereof. In a case where a brake operation is attempted when a leak has developed in apparatus connected to the conduits 91, the master piston 87 will not have been able to produce full braking pressure in the pressure chamber 88 before the master piston 87 has engaged the plate 99a and compressed the spring 101 to such extent that the shank 97a and piston 97 will have been pushed to the right by the master piston 87 to effect release of the retaining means 114. With the positive pressure applied by the master piston 87 to the shank 97a the shank 97a will move to the right regardless of the braking effect thereon of the brake element 102. When the retaining means 114 has been retracted out of retaining position the balanced valve member 92 will shift to close off the one of the outlet ports 89b of the safety device 89 leading to the leak. After this has occurred further movement of the master piston in a brake applying position will build up pressure in the pressure chamber 88a so that the pressure produced will be applied to the brake operating units served through the remaining one of the outlet ports 89b of the safety device 89. Thus it will be seen that the balanced valve member 92 will be retained in centered position at all times when operation of the safety device is unnecessary but will be retracted whenever a leak exists in the system at the time of a braking operation. It will also be seen that the piston 97 will at all times be automatically repositioned to compensate for wear at the brake shoes of the system. The bleed passage 121 will permit equalization of the pressures within the auxiliary cylinder 95 and within the master cylinder 88 for all small or slow movements of the piston 97 without permitting retraction of the retaining element 114. The bleed passage 121 is, however, too small to impair retraction of the retaining means 114 when the piston 97 is quickly moved through a substantial distance as it will be in cases where a leak exists in the system at the time of a braking operation.

The form of the device shown in Fig. 5 includes numerous ones of the elements comprised in the structure of Fig. 4 somewhat differently arranged. The device of Fig. 5 includes a master cylinder 122 having a master piston 123 therewithin on which is a shank 124 which may be connected to a brake pedal in a manner similar to that shown in any one of Figs. 1 to 3 inclusive. A safety device 125 similar to the safety devices in the previously described structures is associated with the head 122a of the master cylinder 122. The safety device 125 has respective outlet ports 125a in the ends thereof between which is located a normally centered longitudinally movable balanced valve member 126 similar to the balanced valve member 23 described in connection with the device in Fig. 1. The exterior portion of the safety device 125 may be formed integrally with the master cylinder head 122a and is positioned with the longitudinal axis of the member 126 disposed normal to the axis of the master cylinder 122. Ports 127 are formed in the cylinder head 122a to establish communication between the interiors of the master cylinder 122 and the safety device 125. The central portion of the shiftable valve member 126 has formed therein a V-shaped annular groove 126a suited for engagement of a retaining element therein. A retaining element 128 which is similar to the retaining element 25 of the structure of Fig. 1 is carried in suitably arranged portions of the safety device 125 so as to be engageable with the annular groove 126a. A helical compression spring 129 is provided for yieldably maintaining the retaining means 128 in engagement in the groove 126a. The lefthand end of the retaining element 128 extends into the interior of the master cylinder 122 and may be pressed to the right to be disengaged from the shiftable valve member 126.

The master piston 123 is recessed on the side thereof toward the cylinder head 122a to form a piston receiving cylinder 130. An auxiliary piston 131 is placed in the recess or cylinder 130. An axially extending passage 131 is formed in the piston 131 and extends between the front and rear ends thereof. Adjacent the end of the piston 131 nearest the cylinder head 132a the passage 131 is of enlarged diameter and contains an enlarged inner end portion 132a of a plunger 132 which extends outwardly of the piston 131. A helical compression spring 133 is placed inwardly of the enlarged portion 132a of the plunger and within the enlarged portion of the passage 131 so as to yieldably maintain the plunger 132 in an outwardly projected position thereof. The free end of the plunger 132 is provided with an enlarged element 132b. A fluid passage 134 is formed in the piston 131 and extends from the outer end thereof to a portion of the passage 131 closely adjacent the inner end of the plunger 132. With the plunger 132 in projected position the passage 134 and the passage 131 together provide communication between the pressure chamber of the master cylinder 122 and the space between the piston 131 and the closed end of the recess or cylinder 130. A helical compression spring 135 is interposed between the closed end of the cylinder 130 and the inner end of the piston 131. The master piston 123 has formed therein a recess 136 containing the brake element 137 engageable with the periphery of the piston 131 in braking relation therewith. A helical compression spring 138 is provided inside the recess 136 to yieldably retain the brake element 137 in braking relation with the piston 131. A recess 139 is formed on the outer periphery of the master piston 131 and the push rod 137a of the brake element 137 extends thereinto. The outer side of the recess 139 is closed by a diaphragm 140 formed of resilient material so as to be deflectable. The center of the diaphragm 140 is secured to the free end of the push rod 137a as by means of a screw 141 and a washer 142, and the marginal portion of the diaphragm 140 is secured to the master piston 123 by means of a ring 143 attached to the master piston as by screws 144. The recess 139 is in communication with the pressure chamber of the master cylinder 132 through a passage 145 formed in the master piston 123.

During a brake applying movement of the master piston 123 fluid pressure within the master cylinder 122 will release the brake element 137 so that the spring 135 may project the piston 131 toward the head 122a. During this operation fluid will flow through the passages 134 and 131 into the inner portion of the recess or cylinder 130. The enlarged end 132b of the plunger 132 will engage the retaining element 128. The spring 133 is proportioned to be secured to the spring 129 and hence the slight further movement of the master piston 123 to the position thereof whereat full braking pressure is obtained is accompanied by compression of the spring 133 rather than shifting of the retaining element 128. If, due to a leak in the brake system, the movement of the master piston 123 is excessive, the enlarged rear portion 132a of the plunger 132 will have become displaced inwardly to such a point as to block the passage 134 and hence lock the auxiliary piston 131 against shifting relative to the master piston 123. Then if the spring 133 is further compressed, the pressure thereon will become sufficient to shift the retaining element 128 out of retaining position to permit shifting of the balanced valve 126. Following operation of the balanced valve 126 to shut off fluid to the leaky portion of the system slight further movement of the master piston will build up pressure which is applied to the portion of the brake system which has not been blocked by the valve member 126. In normal operation of the device when no leak exists in the system, the last portion of a brake applying movement of the master piston 123 will be accompanied by partial compression only of the spring 133 and the position of the piston 123 whereat full braking pressure is obtained will be reached before the retaining element 128 has been shifted. As the master piston 123 is retracted to release the brakes, the pressure in the master cylinder 122 will be quickly diminished to a point where the brake element 137 will be brought to braking relation with the auxiliary piston 131 to restrain the same against shifting relative to the master piston 123. Thus the auxiliary piston 131 will be automatically properly positioned for use in a following brake applying operation of the device.

It is apparent that I have invented novel, effective, compact, rugged and inexpensive apparatus for preventing failure of hydraulic brake systems due to leakage therein and at the same time preventing unnecessary operation of a balanced valve safety device. It is also apparent that my invented device is automatically self-adjusting to compensate for wear in a brake system such as the wear which occurs on the friction surfaces of the brake shoes.

It will, of course, be understood that various changes may be made in the form, details, arrangement and proportions of the various parts without departing from the scope of my invention.

What is claimed is:

1. In a fluid brake system having a pedal-operated master cylinder unit in communication with a safety device cylinder having fluid outlet ports in its respective ends leading to respective independent brake operating hydraulic units and including a normally centered member therewithin shiftable responsive to excessive fluid flow through either one of said ports to cover said one port, releasable means for normally retaining said member in centered position, and means operated by the master cylinder operating pedal responsive to excessive brake applying movement thereof to release said retaining means.

2. In a fluid brake system having a pedal-operated master cylinder unit in communication with a safety device cylinder having fluid outlet ports in its respective ends leading to respective independent brake operating hydraulic units and including a normally centered member therewithin shiftable responsive to excessive fluid flow through either one of said ports to cover said one port, an element for normally retaining said member in normal position, said retaining element being shiftable out of retaining relation with said member, yieldable means for normally holding said retaining element in retaining relation with said member, and mechanism operated by the master cylinder operating pedal responsive to excessive brake applying movement thereof to shift said retaining element out of retaining position.

3. In a fluid brake system having a pedal-operated master cylinder unit in communication with a safety device cylinder having fluid outlet ports in its respective ends leading to respective independent brake operating cylinder units and including a normally centered member therewithin shiftable responsive to excessive fluid flow through either one of said ports to cover said one port, means normally retaining said member in centered position, said retaining means being retractable out of retaining position, mechanism for transmitting brake-applying movement of the pedal of said master unit to said retaining means for retracting the same, and lost-motion means interposed in said mechanism whereby retraction of said retaining means will be effected only by brake-applying movement of said pedal through a distance greater than normal.

4. In a fluid brake system having a pedal-operated master cylinder unit in communication with a safety device cylinder having fluid outlet ports in its respective ends leading to respective independent brake operating cylinder units and including a normally centered member therewithin shiftable responsive to excessive fluid flow through either one of said ports to cover said one port, means normally retaining said member in centered position, said retaining means being retractable out of retaining position, mechanism for transmitting brake-applying movement of the pedal of said master unit to said retaining means for retracting the same, lost-motion means interposed in said mechanism whereby retraction of said retaining means will be effected only by brake-applying movement of said pedal through a distance greater than normal, said lost-motion means being adjustable as to the extent of lost motion, and mechanism operative responsive to successive movements of said pedal through its normal range of movement for increasing said extent by relatively small successive increments to compensate for gradual increase in said range caused by wear.

5. In a fluid brake system having a pedal-operated master cylinder unit in communication with a safety device cylinder having fluid outlet ports in its respective ends leading to respective independent brake operating cylinder units and including a normally centered member therewithin shiftable responsive to excessive fluid flow through either one of said ports to cover said one port, means for normally retaining said member in centered position, said retaining means being movable out of retaining position to release said member, lost-motion means connecting the pedal of said master unit to said retaining means to effect releasing movement thereof responsive to excessive brake-applying movement of said pedal, said lost motion means being adjustable as to the extent of lost motion therein, means operating responsive to a brake-applying movement of said pedal for increasing said extent by an increment proportional to the distance of travel of said pedal, and means operating responsive to a movement of said pedal for decreasing said extent by a predetermined increment.

6. In a fluid brake system having a pedal-operated master cylinder unit in communication with a safety device cylinder having fluid outlet ports in its respective ends leading to respective independent brake operating cylinder units and including a normally centered member therewithin shiftable responsive to excessive fluid flow through either one of said ports to cover said one port, spring pressed means for normally retaining said member in centered position, said retaining means being retractable out of retaining position, a screw extending substantially in the direction of retraction of said retaining means, internally screw-threaded means screw-threadedly carrying said screw and associated with the pedal of said master unit to move in said direction responsive to movement of said pedal in a brake-applying direction, lost motion means connecting said screw to said retaining means, means for screwing said screw toward said retaining means responsive to brake applying movement of said pedal through a distance proportional to the distance of said movement, and means for screwing said screw in a direction away from said retaining means responsive to brake-releasing movement of said pedal.

7. In a fluid brake system having a pedal-operated master cylinder unit in communication with a safety device cylinder having fluid outlet ports in its respective ends leading to respective independent brake operating cylinder units and including a normally centered member therewithin shiftable responsive to excessive fluid flow through either one of said ports to cover said one port, spring pressed means for normally retaining said member in centered position, said retaining means being retractable out of retaining position, a screw screw-threadedly carried by the pedal of said master unit for longitudinal movement therewith, said safety device cylinder being positioned for retractive movement of said retaining means in substantially the same line and direction as said screw, lost motion means connecting said retaining means to said screw for retractive movement of said retaining means responsive to excessive brake-applying movement of said pedal, means for screwing said screw toward said retaining means responsive to brake-applying movement of said pedal through a distance proportional to the distance of pedal travel, and means for screwing said screw away from said retaining means through a predetermined distance responsive to brake-releasing movement of said pedal.

8. In a fluid brake system having a pedal-operated master cylinder unit in communication with a safety device cylinder having fluid outlet ports in its respective ends leading to respective independent brake operating cylinder units and including a normally centered member therewithin shiftable responsive to excessive fluid flow through either one of said ports to cover said one port, spring pressed means for normally retaining said member in centered position, said retaining means being retractable out of retaining position, a screw screw-threadedly carried by the pedal of said master unit for longitudinal movement therewith, said safety device cylinder being positioned for retractive movement of said retaining means in substantially the same line and direction as said screw, lost motion means connecting said retaining means to said screw for retractive movement of said retaining means responsive to excessive brake-applying movement of said pedal, a forwardly facing crown wheel ratchet mounted on the forward end of said screw, a rearwardly inclined pawl swingable about a stationary point and rearwardly spring pressed into engagement with said ratchet for acting thereon to screw said screw toward said retaining element responsive to brake-applying movement of said pedal and to a degree proportional to the distance of pedal travel, a rearwardly facing crown wheel ratchet mounted on said screw in non-rotatable but axially slidable relation therewith, means restraining said last-mentioned ratchet from axial movement relative to said pedal, and a forwardly inclined pawl swingable about a stationary point and forwardly spring pressed into engagement with said last mentioned ratchet for acting thereon to screw said screw through a predetermined distance in a direction away from said retaining element responsive to brake-releasing movement of said pedal.

9. In a fluid brake system having respective independent brake operating cylinder units connected to ports in respective ends of a safety device cylinder containing a normally centered member shiftable responsive to excessive fluid flow through either one of said ports to cover said one port, and having a master cylinder connected to the interior of said safety device cylinder and containing a master piston provided with a shank connected to a brake pedal, spring pressed means normally retaining said member in centered position and retractable out of retaining position, a screw extending parallel to said shank, an internally screw threaded sleeve carried on said screw, an apertured projection on said shank wherein said sleeve is journalled, enlarged elements on said sleeve at opposite sides of said projection, said safety device cylinder being positioned for retraction of said retaining means co-directionally with brake-applying movement of said shank, lost-motion means connecting said screw to said retaining means, one of said enlarged elements being formed into a ratchet, a secondary cylinder communicating with said master cylinder formed in said master piston, a secondary piston in said secondary cylinder, a pawl operated by said secondary piston and working on said ratchet to rotate said sleeve for moving said screw through a predetermined distance toward said master piston responsive to a brake-applying movement thereof, a crown ratchet facing said master piston fixed on said screw, and a pawl swingable about a fixed point inclined toward and engageable with said crown ratchet for operating the same responsive to a brake-applying movement of said master piston to screw said screw away from said master piston through a distance proportional to the distance of that movement.

10. The combination defined in claim 9 and friction means restraining rotation of said sleeve.

11. The combination defined in claim 9 and friction means restraining rotation of said screw.

12. In an automotive fluid braking system, a master unit including a cylinder and a piston working therewithin together defining a pressure chamber, a safety device including a cylinder communicating with said chamber and having ports in its respective ends adapted for connection to respective brake operating cylinder units and a normally centered member within said safety device cylinder shiftable responsive to excessive fluid flow through either one of said ports to close said one port, means normally retaining said member in centered position but shiftable out of retaining condition, a series of elements between said master piston and said retaining means for communicating brake-applying movement of said master piston to said retaining means to shift the latter out of retaining condition, said series having a gap therein when said master piston is in retracted position, said gap being closed during and responsive to brake-applying movement of said master piston, and means yieldable within limits interposed in said series.

13. In an automotive fluid braking system, a master unit including a cylinder and a piston working therewithin together defining a pressure chamber a safety device including a cylinder communicating with said chamber and having ports in its respective ends adapted for connection to respective brake-operating cylinder units and a normally centered member within said safety device cylinder shiftable responsive to excessive fluid flow through either one of said ports to close said one port, an auxiliary cylinder and a piston therewithin a pushrod projecting into said chamber parallel to the axis thereof and from a location external thereto, the outer end of said pushrod being connected to said auxiliary piston for compressive action thereof responsive to movement of said pushrod outwardly of said chamber yielding means on the inner end of said pushrod adapted to be engaged by said master piston during a brake-applying movement thereof a normally applied brake for restraining longitudinal movement of said rod, hydraulic means communicating with said chamber and operative responsive to pressure to release said restraining brake, means for normally retaining said member in centered position, and hydraulic means communicating with said auxiliary cylinder and operative responsive to pressure to release said retaining means.

14. In an automotive fluid braking system, a master unit including a cylinder and a piston working therewithin together defining a pressure chamber, a safety device including a cylinder communicating with said chamber and having ports in its respective ends adapted for connection to respective brake-operating cylinder units and a normally centered member within said safety device cylinder shiftable responsive to excessive fluid flow through either one of said ports to close said one port, an auxiliary cylinder mounted on the head of said master cylinder, a piston in said auxiliary cylinder provided with a pushrod projecting into said chamber, said head being apertured to closely accommodate projection of said rod therethrough, means for normally retaining said member in centered position, said means being retractable to release said member, hydraulic means communicating with the pressure chamber of said auxiliary cylinder and operative responsive to pressure to retract said retaining means yielding means on the free end of said rod adapted to be engaged by said master piston during a brake-applying movement thereof, a normally applied brake for restraining longitudinal movement of said rod hydraulic means communicating with said chamber and operative responsive to pressure to release said restraining brake, and means yieldingly urging said rod toward said master piston.

15. In an automotive fluid braking system a master unit including a cylinder and a piston working therewithin together defining a pressure chamber, a safety device including a cylinder communicating with said chamber and having ports in its respective ends adapted for connection to respective brake-operating cylinder units and a normally centered member within said safety device cylinder shiftable responsive to excessive fluid flow through either one of said ports to close said one port, means normally retaining said member in centered position but shiftable out of retaining condition the inner end of said master piston being recessed to form a secondary cylinder for receiving a piston, a secondary piston in said secondary cylinder a yieldable element on the end of said secondary piston toward the head of said master cylinder, an element in the head of said master cylinder positioned and arranged to be engaged and shifted outwardly by said yieldable element during and responsive to the latter portion of a brake-applying movement of said master piston, said retaining means being connected to said shiftable element to be shifted by outward movement thereof out of retaining condition.

16. In an automotive fluid braking system, a master unit including a cylinder and a piston working therewithin together defining a pressure chamber, a safety device including a cylinder communicating with said chamber and having ports in its respective ends adapted for connection to respective brake-operating cylinder units and a normally centered member within said safety device cylinder shiftable responsive to excessive fluid flow through either one of said ports to close said one port, said safety device cylinder being situated on the outer side of the head of said master cylinder and being disposed normal to the axis thereof, means yieldingly pressed to normally retain said member in centered position, said retaining means being extended into said chamber and being shiftable outwardly relative to said head out of retaining position, the inner end of said master piston being recessed to form a secondary cylinder for receiving a piston, a secondary piston in said secondary cylinder, resilient means urging said secondary piston outwardly, yieldable means on the outer end of said secondary piston for engagement with said retaining means to transmit thrust thereto from said master piston during the latter portion of a brake-applying movement of said master piston, a fluid passage running between the inner and outer ends of said secondary piston, means associated with said passage and said yieldable means for closing the former responsive to yielding of the latter, a yieldingly pressed brake normally restraining movement of said secondary piston relative to said master piston, and hydraulic means associated with said brake and communicating with said chamber to release said brake responsive to pressure in said chamber.

17. In a fluid brake system having a pedal-operated master cylinder unit in communication with a safety device cylinder having fluid outlet ports in its respective ends leading to respective independent brake operating cylinder units and including a normally centered member therewithin shiftable responsive to excessive fluid flow through either one of said ports to cover said one port, means for normally retaining said member in centered position, said retaining means being movable out of retaining position to release said member, lost-motion means connecting the pedal of said master unit to said retaining means to effect releasing movement thereof responsive to excessive brake-applying movement of said pedal, said lost motion means being adjustable as to the extent of lost motion therein, means operating responsive to production of braking pressure for increasing said extent by a small increment, and means operating responsive to a movement of said pedal for decreasing said extent by a predetermined increment.

WILLIS H. GILLE.